US011905107B2

(12) United States Patent
Gustavsson

(10) Patent No.: US 11,905,107 B2
(45) Date of Patent: Feb. 20, 2024

(54) CONSTRUCTION ELEMENT FOR A CONTAINER, DOOR FOR A CONTAINER AND A CONTAINER

(71) Applicant: CESIUM AB, Katrineholm (SE)

(72) Inventor: Jack Gustavsson, Katrineholm (SE)

(73) Assignee: CESIUM AB, Katrineholm (SE)

( * ) Notice: Subject to any disclaimer, the term of this patent is extended or adjusted under 35 U.S.C. 154(b) by 409 days.

(21) Appl. No.: 17/419,336

(22) PCT Filed: Dec. 3, 2019

(86) PCT No.: PCT/SE2019/051220
§ 371 (c)(1),
(2) Date: Jun. 29, 2021

(87) PCT Pub. No.: WO2020/141990
PCT Pub. Date: Jul. 9, 2020

(65) Prior Publication Data

US 2021/0340806 A1 Nov. 4, 2021

(30) Foreign Application Priority Data

Jan. 4, 2019 (SE) .................................... 1930003-7

(51) Int. Cl.

| | |
|---|---|
| ***B65D 90/02*** | (2019.01) |
| ***B65D 90/00*** | (2006.01) |
| ***E05G 1/02*** | (2006.01) |
| ***E05G 1/024*** | (2006.01) |
| ***E05G 1/026*** | (2006.01) |

(52) U.S. Cl.
CPC ......... *B65D 90/028* (2013.01); *B65D 90/008* (2013.01); *E05G 1/024* (2013.01); *E05G 1/026* (2013.01); *B65D 2590/02* (2013.01)

(58) Field of Classification Search
CPC .... B65D 90/028; B65D 90/02; B65D 90/008; B65D 88/12; B65D 88/121; B65D 1/40; E05G 1/024; E05G 1/026
USPC .......................... 220/1.5, 668, 660, 921, 918
See application file for complete search history.

(56) References Cited

U.S. PATENT DOCUMENTS

| | | | | |
|---|---|---|---|---|
| 2,489,670 A * | 11/1949 | Powell, Jr. | B65D 90/08 | 52/282.4 |
| 3,118,559 A * | 1/1964 | Stricker, Jr. | B65D 88/741 | 220/676 |
| 3,453,974 A | 7/1969 | Gerard | | |

(Continued)

FOREIGN PATENT DOCUMENTS

| | | | |
|---|---|---|---|
| CA | 2864601 A1 * | 8/2013 | B28B 13/00 |
| CN | 105416321 A | 3/2016 | |

(Continued)

OTHER PUBLICATIONS

Translation of FR 2459350, Fichet-Bauche, Jan. 9, 1981, p. 3 (Year: 1981).*

(Continued)

*Primary Examiner* — Robert J Hicks
(74) *Attorney, Agent, or Firm* — WRB-IP PLLC

(57) ABSTRACT

A construction element includes a first wall, and a second wall. The walls are arranged at a distance from one another, forming a space wherein at least one non-concrete composite bar is arranged. Concrete is arranged in the space between the first wall, the second wall, and the composite bars.

7 Claims, 2 Drawing Sheets

(56) References Cited

U.S. PATENT DOCUMENTS

| | | | | | |
|---|---|---|---|---|---|
| 4,212,406 | A | * | 7/1980 | Mittelmann | B65D 88/14 220/4.28 |
| 4,826,644 | A | * | 5/1989 | Lindquist | B67D 7/78 264/32 |
| 5,271,493 | A | * | 12/1993 | Hall | B65D 90/042 220/565 |
| 2004/0185213 | A1 | | 9/2004 | Skelton et al. | |
| 2018/0051503 | A1 | | 2/2018 | Alarcon | |

FOREIGN PATENT DOCUMENTS

| | | | | | |
|---|---|---|---|---|---|
| DE | 496228 | C | | 4/1930 | |
| DE | 10051028 | A1 | | 5/2002 | |
| FR | 2459350 | A | * | 2/1981 | E05G 1/024 |
| FR | 2539800 | | | 7/1984 | |
| RU | 2427699 | C1 | | 8/2011 | |
| WO | 2005069747 | A2 | | 8/2005 | |
| WO | 2013086638 | A1 | | 6/2013 | |
| WO | 2018099528 | A1 | | 6/2018 | |

OTHER PUBLICATIONS

Chinese Official Action (dated Jan. 20, 2023) for corresponding Chinese App. 201980087721.1 (translation of International-type search report attached).

International Search Report (dated Feb. 25, 2020) for corresponding International App. PCT/SE2019/051220.

* cited by examiner

CONSTRUCTION ELEMENT FOR A CONTAINER, DOOR FOR A CONTAINER AND A CONTAINER

BACKGROUND AND SUMMARY

The present invention relates to construction elements for containers. The invention further relates to doors for containers. The invention further relates to containers.

Safe or secure storage of articles, goods or property is important to protect valuable articles, to secure high value, to prevent access to unauthorized or unqualified persons, or for burglary protection. Further reasons to store content in a controlled environment could also include protecting the contents from damage during a flood, fire, or natural disaster.

For specific articles, such as weapons, certain medical and/or chemical articles and explosives, access prevention is required by law in many locations/jurisdictions. Access prevention for certain articles could also be required for insurance purposes.

A safe is commonly used for storing the valuable articles, and the safety level of the safe is commonly tested by a certification company/organization such as UL, TÜV or RISE (formerly SP Sveriges Tekniska Forskningsinstitut in Sweden) in accordance with a specific standard, such as EN 1143-1. Commonly the safe or lock is graded with a certain protection level. A safe with a high protection grade requires a long time and much effort to force.

An example of a storage container arranged with a construction element is described in patent application WO2005/069747 A1. A drawback with currently existing solutions according to WO2005/069747 A1 is that the described construction element has a wide cross section, leading to thick walls with large amount of concrete that is thus leading to heavy containers.

Further problems which the present invention aims to solve will be elucidated below in the detailed description of the various embodiments.

It is desirable to provide a novel and improved construction element for a container and specifically a safe container.

The invention relates, according to an aspect thereof, to a construction element for a container where the construction element comprises a first wall, and a second wall, arranged at a distance from one another, forming a space where at least one non-concrete composite bar is arranged, and where concrete is arranged in the space between the first wall, the second wall, and the composite bar.

According to further aspects of the improved construction element for a container, the construction element further comprises that;

- the non-concrete composite is a composite comprising at least two of the components; a polymer, an organic material, and a metal.
- the polymer is polyethylene.
- the organic material is wood fibre.
- the metal is aluminium.
- the non-concrete composite bars are arranged with a separating distance between them.
- the separating distance is between 150 mm to 250 mm.
- at least one of the first wall and the second wall is made of steel plate armour.
- a first sidewall and a second sidewall are arranged to the first wall and the second wall to mutually form a die for casting of concrete and holding the concrete after pouring the concrete.
- the concrete comprises at least one additive selected from wood pellets, plastic pellets, and/or metal pellets.

- the thickness of the construction element is in the range of 140 mm 180 mm.

The invention further relates, according to an aspect thereof, to an improved door comprising a construction element, at least one lock, and at least one hinge.

The invention further relates, according to an aspect thereof, to an improved container comprising at least one construction element and a door.

Advantages of aspects of the present invention includes that safety of containers is improved and that the wall thickness of the construction element is reduced which results in lower total weight of the construction element and thus the container.

BRIEF DESCRIPTION OF THE DRAWINGS

The invention will be described in greater detail below with reference to the attached figures, in which.

DETAILED DESCRIPTION

Figure 1:
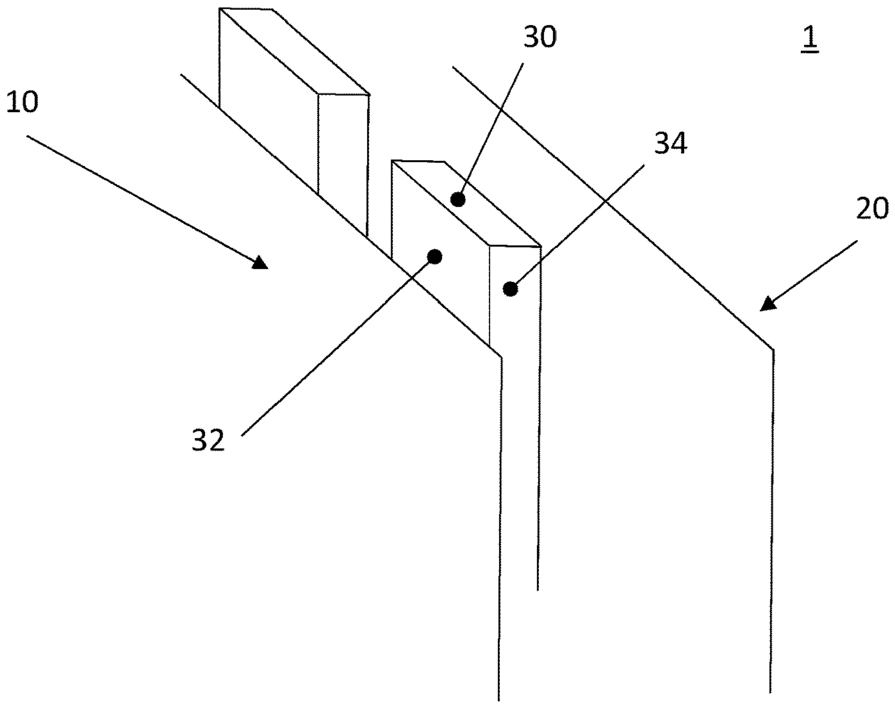
FIG. 1 shows a figure of a construction element according to one embodiment of the invention.

FIG. 1 shows a figure of a construction element 1 according to one embodiment of the invention. The construction element is in particular a wall element, a door element, a lower element or an upper element of a container. Containers, also known as intermodal containers, are means to bundle cargo and goods into larger, unitized loads, that can be easily handled, moved, and stacked, and that will pack tightly in a ship or yard. Intermodal containers are designed to function with different modes of transportation, so that the transported goods do not have to be reloaded during the transport. Such reloading would in itself pose a risk for theft, damage etc. of the goods.

Intermodal containers share a number of key construction features to withstand the stresses of intermodal shipping, to facilitate their handling and to allow stacking, as well as being identifiable through their individual, unique reporting mark according to ISO 6346.

Lengths of containers vary from 8 to 56 feet (2.4 m to 17.1 m). Most commonly used containers are twenty (6.1 m) or forty (12.2 m) foot standard length boxes of general purpose or “dry freight” design. These typical containers are rectangular, closed box models, with doors fitted at one end, and made of corrugated weathering steel (commonly known as corten) with a plywood floor. Corrugating the sheet metal used for the sides and roof contributes significantly to the container’s rigidity and stacking strength.

Standard containers are 8-foot (2.44 m) wide by 8-foot and 6 inches (2.59 m) high or the taller “High Cube” or “hi-cube” units measuring 9 feet 6 inches (2.90 m).

ISO containers have castings with openings for twistlock fasteners at each of the eight corners, to allow gripping the box from above, below, or the side, and they can be stacked up to ten units high. Regional intermodal containers, such as European and U.S. domestic units however, are mainly transported by road and rail, and can frequently only be stacked up to three laden units high.

Container capacity is often expressed in twenty-foot equivalent units (TEU, or sometimes teu).

As seen in FIG. 1, a construction element 1 comprises a first wall element 10 and a second wall element 20. The wall elements 10, 20 are preferably made of steel, commonly the wall elements of containers are made of corrugated steel. The reason corrugated steel is used is mainly to increase the rigidity of the container and thus allow stacking of containers.

In a container utilizing the described construction element 1 there is no specific need to utilize corrugated walls since the rigidity of the containers is increased by the described construction element 1. Corrugated wall elements could nevertheless be used in the described construction element 1 to further increase rigidity, or so that a container manufactured with the described construction element 1 gives the visual impression to be an ordinary container.

Commonly the material used in the wall elements 10, 20 is corten steel or some other material with an increased resistance to corrosion compared to ordinary steel. The wall elements 10, 20 could also be armoured steel to further increase the resistance of the construction elements 1 to external forces.

Armoured steel must be hard, yet resistant to shock, in order to resist high velocity metal projectiles. Steel with these characteristics is produced by processing cast steel billets of appropriate size and then rolling them into plates of required thickness. I-lot rolling homogenizes the grain structure of the steel, removing imperfections which would reduce the strength of the steel. Rolling also elongates the grain structure in the steel to form long lines, which distribute stress loaded onto the steel throughout the metal, avoiding a concentration of stress in one area. This type of steel is called rolled homogeneous armour or RHA. RHA is homogeneous because its structure and composition is uniform throughout its thickness. The opposite of homogeneous steel plate is cemented or face-hardened steel plate, where the face of the steel is composed differently from the substrate. The face of the steel, which starts as an RHA plate, is hardened by a heat-treatment process.

A number of non-concrete, composite bars 30 are arranged side by side in the construction element 1 between the wall elements 10, 20. The composite bars 30 are, in the preferred embodiment generally flat, with a rectangular cross-section. Hence they have two larger surfaces 32 and two narrow side surfaces 34. In the preferred embodiment shown in FIG. 1, the bars 30 extend in an approximately vertical direction. The bars 30 are also preferably arranged with their larger surfaces 32 facing the inside surfaces of the wall elements 10, 20, in particular approximately parallel with the inside surfaces.

Figure 2:
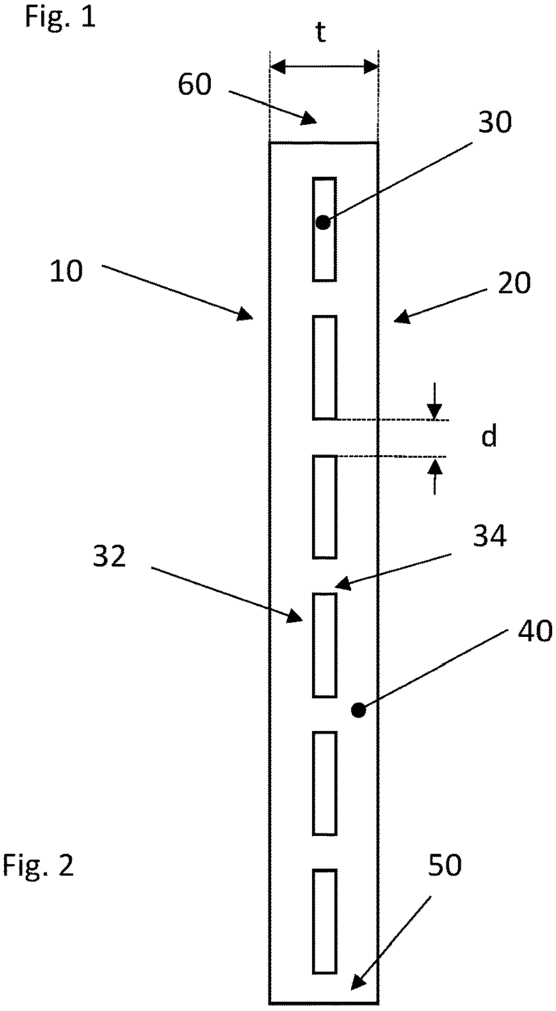
FIG. 2 shows a figure of a construction element in a view from above according to one embodiment of the invention.

FIG. 2 shows the construction element 1 in a view from above in an embodiment with six non-concrete composite bars 30. The non-concrete composite bars 30 are preferably separated with a distance d of 150 mm to 250 mm and preferably arranged with equal distance to the first wall element 10 and the second wall element 20.

The construction element 1 is filled with concrete, i.e. a composite of at least cement and construction aggregate. Construction aggregate is a broad category of coarse to medium grained particulate material used in construction, including sand, gravel, crushed stone, slag, recycled concrete and/or geosynthetic aggregates. Aggregates are a component of composite materials such as concrete and asphalt concrete; the aggregate serves as reinforcement to add strength to the overall composite material. As an option, the concrete may also comprise a concrete additive, selected from wood pellets, plastic pellets, and/or metal pellets. Concrete additives with a low density serve to reduce the total weight of the construction element 1. Concrete additives with a high density will increase the total weight, but are an option for providing the concrete with desirable properties, such as an increased resistance to cutting.

The bars 30 are non-concrete, i.e. not made from a composite of cement and construction aggregate. The non-concrete composite material is preferably a composite, preferably a bio-composite, comprising plastic, wood fibre and an additive. An alternative plastic could be polyethylene. The additive is preferably a metal, such as aluminium. A commercial example of a bio-composite is DuraSense™ but other alternatives of composites or bio-composites are also possible to use. The wood fibre content of the non-concrete composite could be in the range of 10%-60%. Bio-composite is a composite material formed by a matrix (resin) and a reinforcement of natural fibres. Bio-composites often mimic the structure of the living materials involved in the process keeping the strengthening properties of the matrix that was used, but always providing biocompatibility. The matrix phase is formed by polymers derived from renewable and non-renewable sources.

The matrix is important to protect the fibres from environmental degradation and mechanical damage, to hold the fibres together and to transfer the loads on it. In addition, bio-fibres are the principal components of bio-composites, which are derived from biological origins, for example fibres from crops (cotton, flax or hemp), recycled wood, waste paper, crop processing by products or regenerated cellulose fibre (viscose/rayon). Benefits of bio-composites are that they are renewable, cheap, recyclable, and biodegradable. Bio-composites can be used alone, or as a complement to standard materials, such as carbon fibre. Bio-composites have lower density compared to wood.

The construction element 1 comprises at least four elements, two steel walls 10, 20, concrete 40, and the non-concrete composite bars 30. In case there is an intention to force or break through the construction element 1, the first wall element 10 is the first surface that has to be forced. To penetrate the steel wall 10, a gas burner or blowtorch or other heat generating means could be used. When the first wall element 10 is penetrated the next step would be to penetrate the concrete 40. Concrete is preferably penetrated by drilling and/or sawing or some other cutting operation.

By adequate selection of the material of the non-concrete composite such as to inhibit the cutting operation, the time needed to penetrate the concrete/non-concrete combination of the construction element 1 is prolonged. When the concrete/non-concrete composite combination has been penetrated, the second wall 20 has to be penetrated and heat generating means needs to be used once again. In one embodiment a first sidewall 50 and a second sidewall 60 are arranged at the lateral ends of the first wall 10 and the second wall 20, to form a mould or die formed space in which the non-concrete composite bars 30 are arranged together with rebar or reinforcing bars. The rebar is preferably arranged to hold the non-composite bars 30 in the intended places before pouring of the concrete 40. The concrete is poured into the void space made up of the four wall elements, the first sidewall 50, the second sidewall 60, the first wall 10 and the second wall 20, and the non-concrete composite bars 30. The thickness t of the construction element 1 is preferably in the range of 140 mm to 180 mm.

The general idea of the construction element is hence making penetration thereof as complicated, and as time-consuming, as possible. Thereby there is an increased risk of discovery of an attempt of forced entry before it has been completed. The different materials in the construction element require different means for the penetration thereof. The heat generating means required to penetrate the outer first and second walls 10, 20 are inefficient for penetration of the concrete 40.

The cutting means required for penetration of the concrete will be adversely affected by the non-concrete composite material encountered when the bars 30 are reached. The fibres included in the non-concrete composite will to some extent be entangled with the cutting means, thereby impeding its movements. The additive, which is preferably a metal, has a dulling effect on the cutting means, thereby making it less efficient, both for the cutting through the bars 30, and for the continued cutting through the concrete 40.

Figure 3:
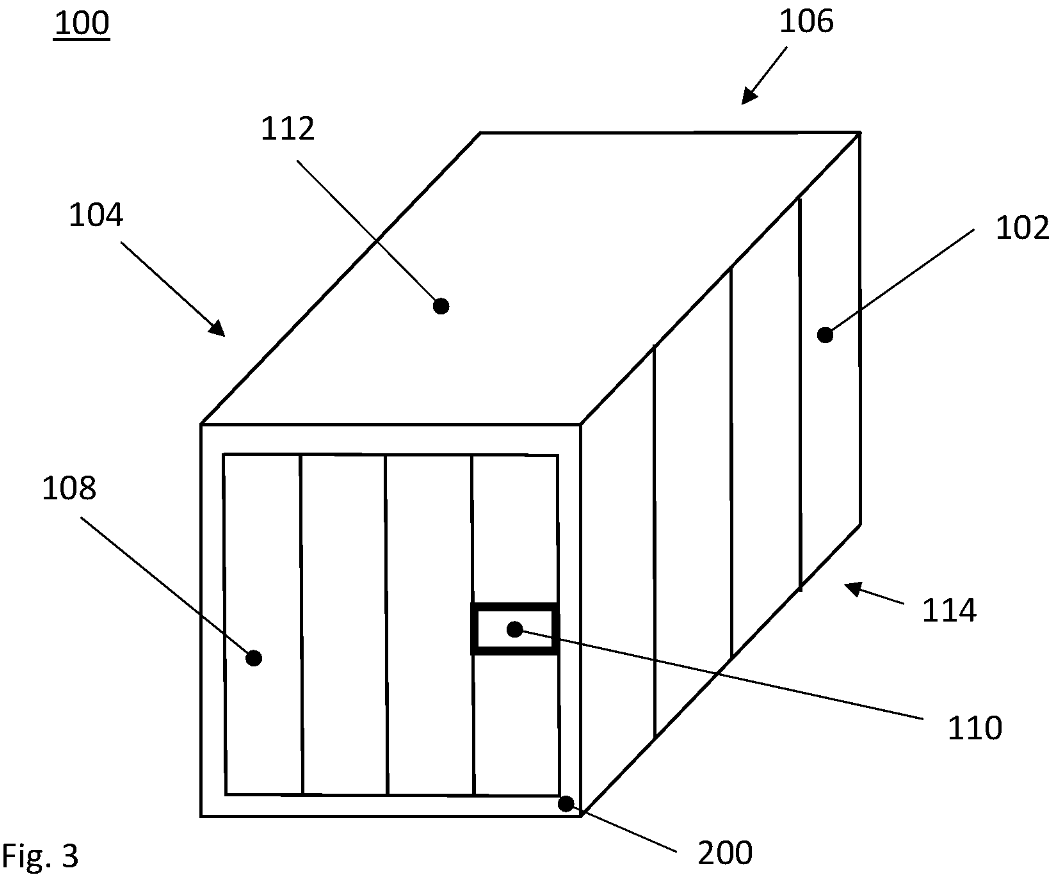
FIG. 3 shows a figure of a container according to one embodiment of the invention.

FIG. 3 shows a container 100. A container 100 in a typical embodiment has an upper element, a lower element and four wall elements and at least one door. In traditional transport containers, the doors are commonly a two part construction arranged at one of the side walls. In a security container a single door is preferable. The container shown in FIG. 3 comprises a first wall element 102, a second wall element 104, and a third wall element 106. The container further comprises a door element 108 arranged in a frame 200 holding the door element 108. The door element 108 is preferable arranged with a lock, not shown in FIG. 3, arranged behind a lock protector shield 110. The container 100 further comprises an upper element 112 and a lower element 114.

Figure 4:
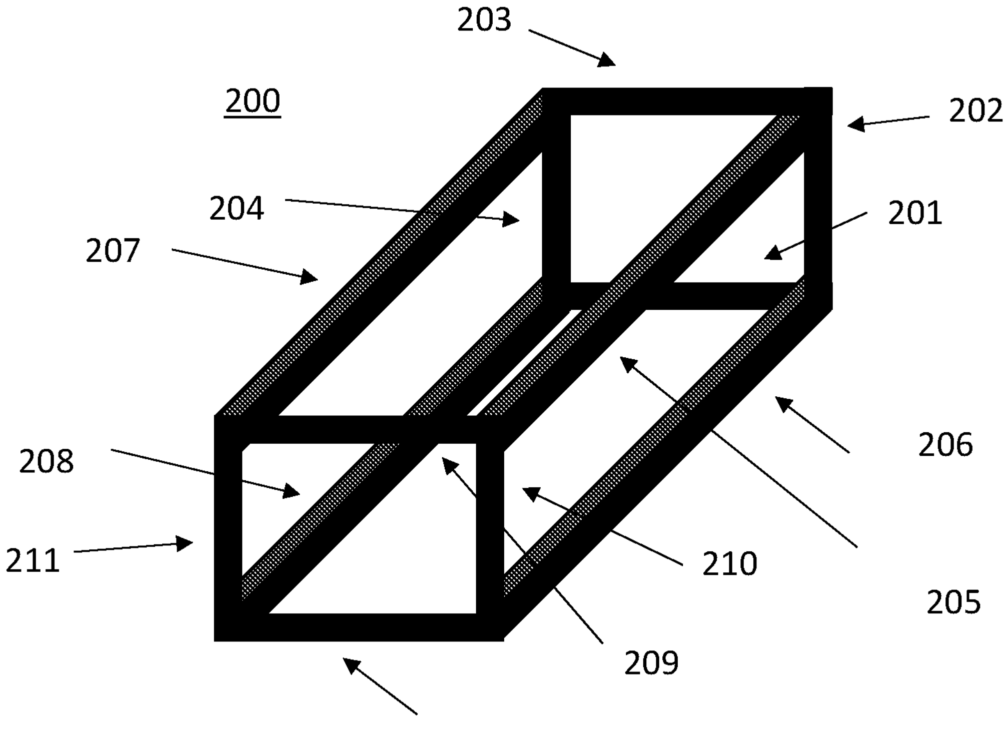
FIG. 4 shows the frame for a container according to one embodiment of the invention.

FIG. 4 shows the frame 200 for a container. The frame has a shape where bars extend along the edges of an imagined cuboid, and it is preferably be made of steel, concrete or some other material with sufficient strength. The frame 200 is preferably made of twelve bars 201, 202, 203, 204, 205, 206, 207, 208, 209, 210, 211, 212 arranged to form a frame 200. In a container 100 a number of construction elements 1 are arranged, preferably an upper element 112, a lower element 114 and three wall elements 102, 104, 106 and at least one door element 108, to a frame 200. The construction elements 1 are secured to the frame 200 by fastening means such as bolts, rivets or other fastening means. Holding means for the door element 108 are hinges arranged to the frame 200. The hinges are not visible in the drawings, but they are of any form known to the skilled person, preferably provided with means for preventing the door element 108 from being lifted off of the hinges.

The invention is not limited to the embodiments specifically shown, but can be varied in different ways within the scope of the patent claims.

It will be appreciated, for example, that the size, material and how the components of the construction element are arranged, as well as the integral elements and component parts, is adapted to the needs of the user and/or customer of the construction element, and other current design characteristics.

The invention claimed is:

1. Construction element for a container, the construction element comprising a first wall, a second wall, the first wall and the second wall being arranged at a distance from one another and forming a space, a plurality of bars made of a non-concrete composite, the bars being arranged side by side in the space, the non-concrete composite comprising at least two of a polymer, an organic material, and a metal, the bars being arranged with a separating distance between 150 mm to 250 mm, and concrete between the first wall, the second wall, and the composite bars, wherein the polymer is polyethylene, the organic material is wood fiber, and the metal is aluminum.

2. Construction element according to claim 1 wherein at least one of the first wall and the second wall is made of steel plate armour.

3. Construction element according to claim 1 wherein a first sidewall and a second sidewall are arranged to the first wall and the second wall to mutually form a die for casting of concrete and holding the concrete after pouring the concrete.

4. Construction element according to claim 1 wherein the concrete comprises at least one additive selected from wood pellets, plastic pellets, and/or metal pellets.

5. Construction element according to claim 1 wherein the thickness (t) of the construction element is in the range of 140 mm-180 mm.

6. Door for a container comprising a construction element according to claim 1, at least one lock, and at least one hinge.

7. Container comprising at least one construction element according claim 1 and a door comprising at least one lock and at least one hinge.

* * * * *